(12) United States Patent
Hyatt et al.

(10) Patent No.: US 8,083,445 B2
(45) Date of Patent: Dec. 27, 2011

(54) HOLDER MAIN BODY

(75) Inventors: Gregory Aaron Hyatt, South Barrington, IL (US); Abhijit Uday Sahasrabudhe, Wheeling, IL (US); Tomohiko Hayashi, Mount Prospect, IL (US)

(73) Assignee: Mori Seiki Co., Ltd., Yamatokoriyama-shi, Nara-ken (JP)

( * ) Notice: Subject to any disclaimer, the term of this patent is extended or adjusted under 35 U.S.C. 154(b) by 811 days.

(21) Appl. No.: 12/153,011

(22) Filed: May 12, 2008

(65) Prior Publication Data

US 2009/0279964 A1 Nov. 12, 2009

(51) Int. Cl.
*B23B 47/34* (2006.01)

(52) U.S. Cl. .......................................... 409/137; 408/58

(58) Field of Classification Search .................. 409/137, 409/234; 279/20; 408/56, 58, 67; 175/207, 175/209, 211, 213
See application file for complete search history.

(56) References Cited

U.S. PATENT DOCUMENTS

| | | | |
|---|---|---|---|
| 999,032 A * | 7/1911 | Holub et al. ...................... 79/16 |
| 3,694,099 A * | 9/1972 | Nicholas ........................ 408/58 |
| 4,036,308 A * | 7/1977 | Dellenberg ...................... 173/75 |
| 5,028,178 A * | 7/1991 | Ronen ........................... 409/136 |
| 5,487,630 A * | 1/1996 | Campian ....................... 409/225 |
| 6,065,908 A * | 5/2000 | Kleine et al. ................... 408/67 |
| 7,311,481 B2 | 12/2007 | Kammermeier et al. |
| 7,419,341 B2 * | 9/2008 | Granger ......................... 409/137 |
| 7,563,060 B2 * | 7/2009 | Kesterson et al. .............. 408/67 |
| 7,591,615 B2 * | 9/2009 | Li et al. ........................... 408/67 |
| 2008/0069651 A1 | 3/2008 | Kammermeier et al. |

FOREIGN PATENT DOCUMENTS

| DE | 3501860 A * | 9/1985 |
| JP | 03066509 A * | 3/1991 |
| JP | 10-43988 A | 2/1998 |
| JP | 2005-532917 A | 11/2005 |

* cited by examiner

*Primary Examiner* — Daniel Howell
(74) *Attorney, Agent, or Firm* — Smith Patent Office

(57) ABSTRACT

There is provided a holder main body which has a simple structure, allows automatic tool change, and has high suction efficiency of cutting chips to be capable of preventing internal deposition. There is provided a holder man body having a mounting hole in which a cutting tool is attachable and attached to a spindle of a machine tool, the holder main body including: a second suction hole which penetrates through the holder main body in an axial direction so as to be connected with a first suction hole penetrating in the axial direction through the cutting tool attached in the mounting hole; and a third suction hole connected with the second suction hole and capable of sucking air other than suction air coming from the first suction hole.

1 Claim, 6 Drawing Sheets

HOLDER MAIN BODY

BACKGROUND OF THE INVENTION

1. Field of the Invention

The present invention relates to a holder main body, more particularly, to a holder main body realizing improved collection efficiency of cutting chips in dust form generated when light metal is machined.

2. Description of the Related Art

As a milling cutter in which cutting chips in dust form generated when, for example, a magnesium alloy is machined can be collected, there is one described in Japanese Translation of PCT Publication No. 2005-532917. This milling cutter has a suction opening formed in an axial core of a shank, and the suction opening is connected with a suction hopper attached to a clamping and supplying device.

Further, Japanese Patent Application Laid-open No. Hei 10-43988 proposes the following chip discharge structure. In this chip discharge structure, a chip housing body is provided around a cutter main body to form a chip discharge space, and the chip discharge space is connected with a suction mechanism. Further, chip guide members are provided in a chip pocket to form clearances between the chip guide members and cutting faces of cutting edges, thereby making it possible to guide chips to the chip discharge space.

SUMMARY OF THE INVENTION

The aforesaid milling cutter described in Japanese Translation of PCT Publication No. 2005-532917 has a problem that the structure is complicated since the suction hopper is attached to the clamping and supplying device, and automatic tool change is not possible due to a structural reason. Further, in the aforesaid conventional milling cutter, since a passage area of the suction hopper is larger than a passage area of the suction opening, there may occur a problem that the velocity of suction air lowers in the suction hopper portion and cutting chips settle in this portion to deposit.

The aforesaid chip discharge structure described in Japanese Patent Application Laid-open No. Hei 10-43988 has a problem of low suction efficiency since chips guided to a portion, of the chip discharge space, distant from a connection point of the suction mechanism are not easily sucked.

It is an object of the present invention to provide a holder main body having a simple structure, allowing automatic tool change, and having high suction efficiency of cutting chips and thus capable of preventing the cutting chips from accumulating inside.

According to an aspect of the present invention, there is provided a holder main body having a mounting hole in which a cutting tool is attachable and attached to a spindle of a machine tool, the holder main body including: a second suction hole which penetrates through the holder main body in an axial direction so as to be connected with a first suction hole penetrating in the axial direction through the cutting tool attached in the mounting hole; and a third suction hole connected with the second suction hole and capable of sucking air other than suction air coming from the first suction hole.

According to the present invention, the second suction hole penetrating through the holder main body in the axial direction so as to be connected with the first suction hole of the cutting tool and the third suction hole sucking the air other than the suction air coming from the first suction hole are provided in the holder main body. Therefore, when cutting chips generated during machining are sucked through a suction hole in a draw bar which brings the holder main body into attachment to the spindle and clamps/unclamps the holder main body, even if the first suction hole of the cutting tool is small and thus the suction air in the second suction hole cannot have a sufficiently high velocity, the air other than the suction air in the first suction hole can be sucked through the third suction hole. This can increase the velocity of the suction air in the second suction hole, so that it is possible to prevent the cutting chips from depositing in the holder main body and the draw bar.

Further, since a collection passage and the like of the cutting chips need not be provided outside the holder main body, tools can be automatically changed by a conventional automatic tool changer without hindrance.

In a preferable embodiment of the present invention, a passage area of the third suction hole is adjustable.

According to this embodiment, since the passage area of the third suction hole is adjustable, the passage area and, as a result, the velocity of the suction air can be adjusted according to the size of the first suction hole of the cutting tool and a generation amount of the cutting chips, which can prevent the cutting chips from depositing in the holder main body and the draw bar.

According to another preferable embodiment of the present invention, the third suction hole has: a suction part which is formed as an opening extending in an axial direction in a ring member rotatably attached to the holder main body; and a connection part which is formed in the holder main body and via which the suction part and a vicinity of a connection portion between the first and second suction holes are connectable, and a substantial passage area of the third suction hole is adjustable by adjustment of an angle position of the ring member.

According to this embodiment, the third suction hole has: the suction part formed in the ring member rotatably attached to the holder main body; and the connection part via which the suction part and the vicinity of the connection portion between the first and second suction holes are connectable. Consequently, by adjusting the angle position of the ring member, it is possible to adjust the substantial passage area of the third suction hole according to the diameter of the cutting tool and the generation amount of the cutting chips, which can prevent the internal deposition of the cutting chips.

According to still another preferable embodiment of the present invention, the cutting tool is attached to the holder main body via a collet, and the third suction hole is formed in the collet so as to be positioned on a diameter-direction outer side of the first suction hole and so as to penetrate through the collet in the axial direction.

According to this embodiment, the third suction hole is formed in the collet. Therefore, even if the passage area of the first suction hole of the cutting tool varies, only by selecting the optimum collet in which the third suction hole is formed in advance according to the diameter of the cutting tool and the passage area of the first suction hole, it is possible to keep the velocity of the suction air in the second suction hole high enough to prevent the internal deposition.

BRIEF DESCRIPTION OF THE DRAWINGS

The structure and effects of the present invention will be fully understood from the following detailed description and the accompanying drawings.

DETAILED DESCRIPTION OF THE PREFERRED EMBODIMENTS

Figure 1:
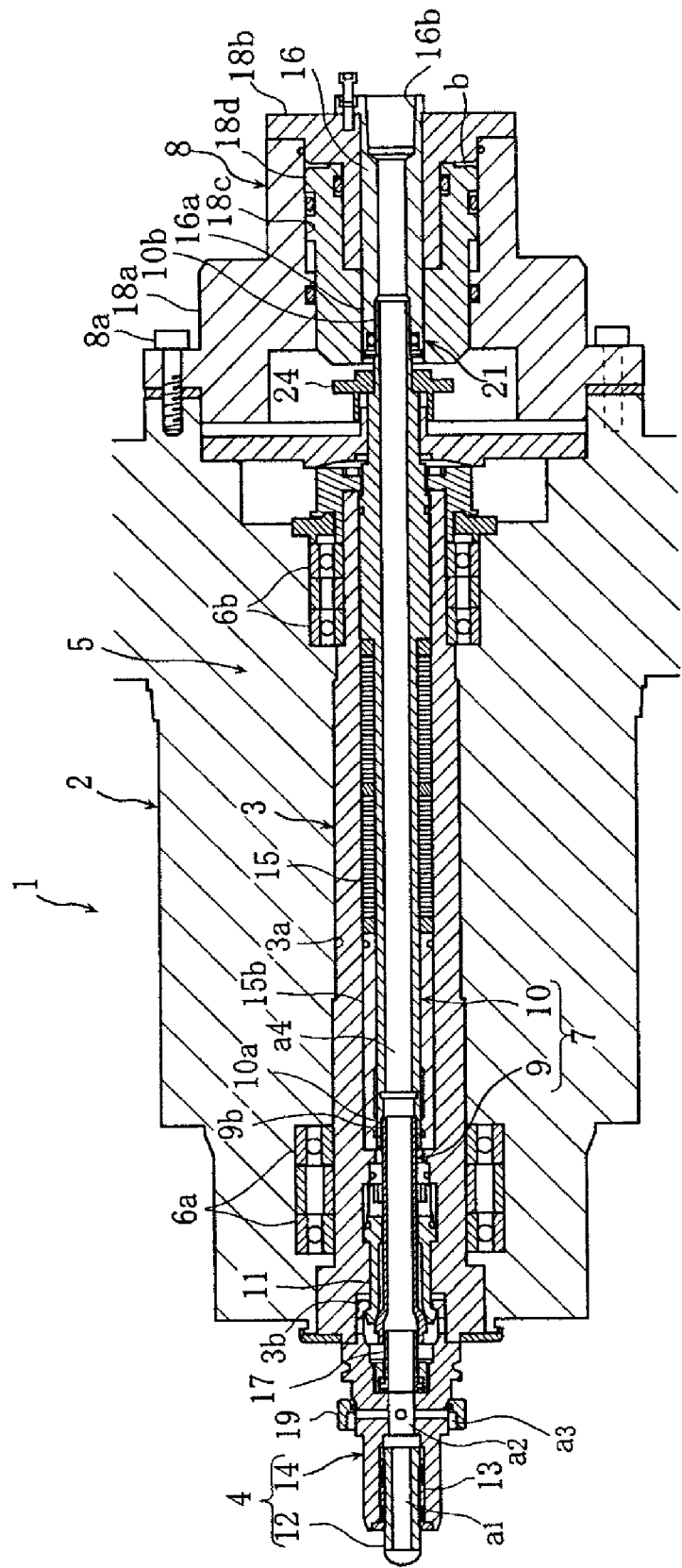
FIG. 1 is a side sectional view of a spindle device including a holder main body according to a first embodiment of the present invention.
Figure 2:
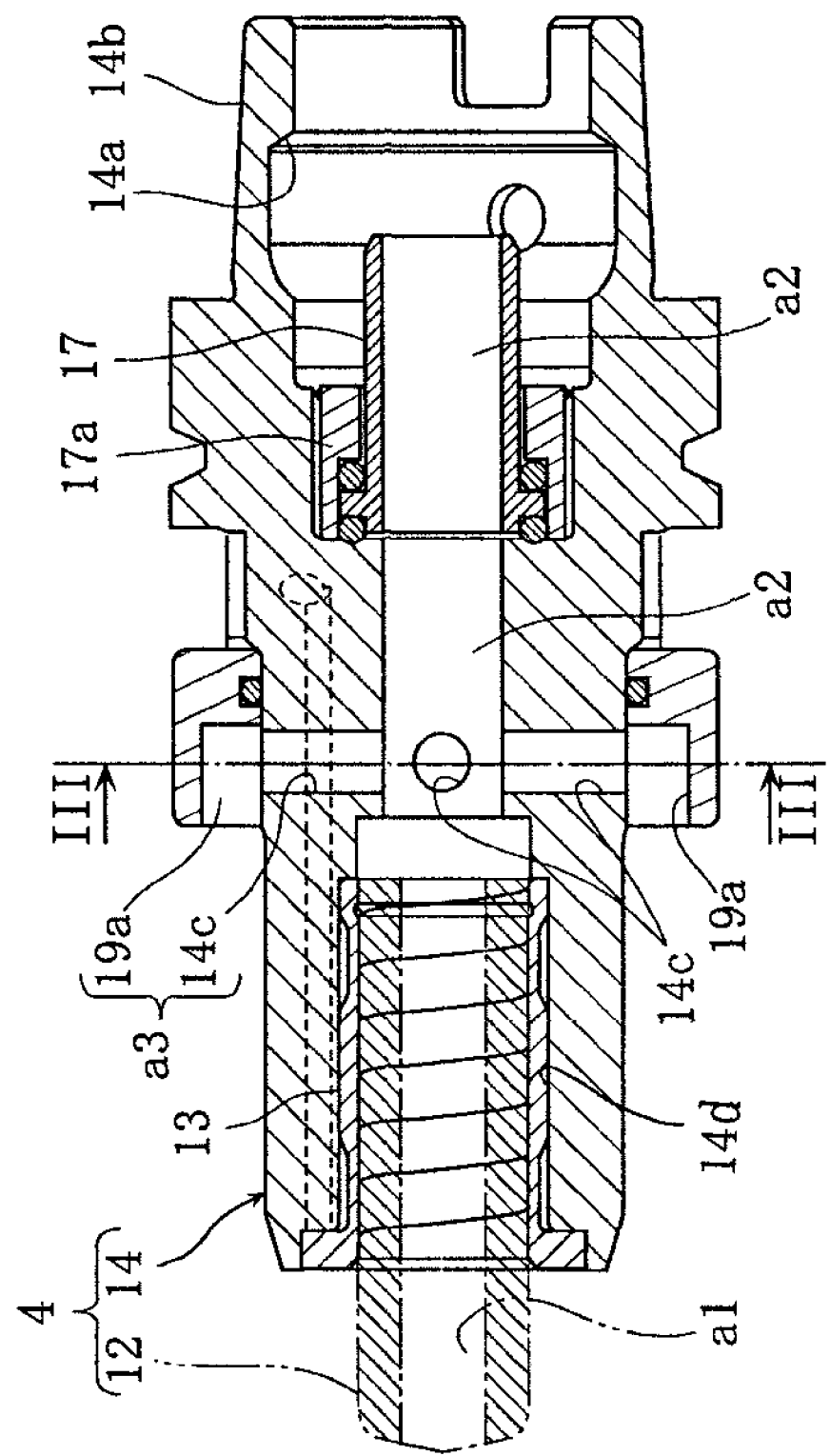
FIG. 2 is a side sectional view of the holder main body.
Figure 3:
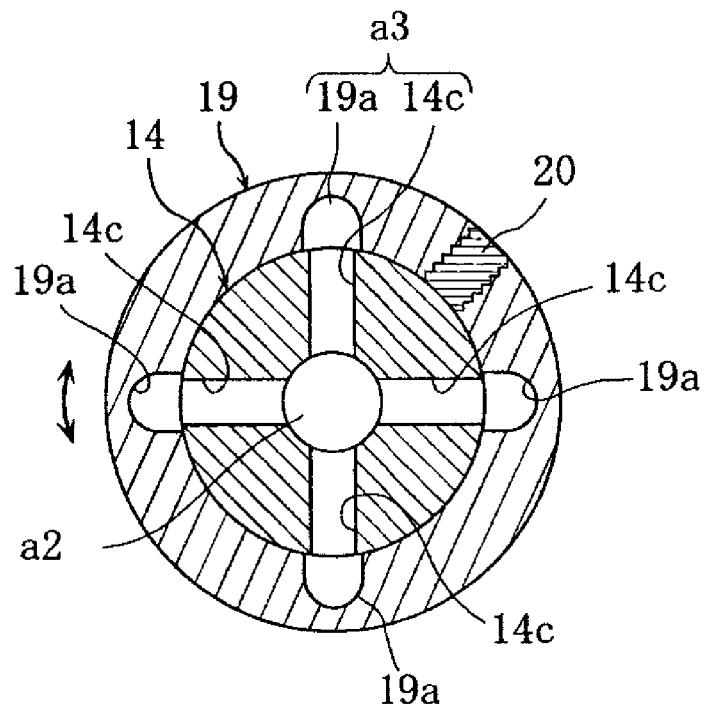
FIG. 3 is a side sectional view of the holder main body (sectional view taken along III-III line in FIG. 2)
Figure 4:
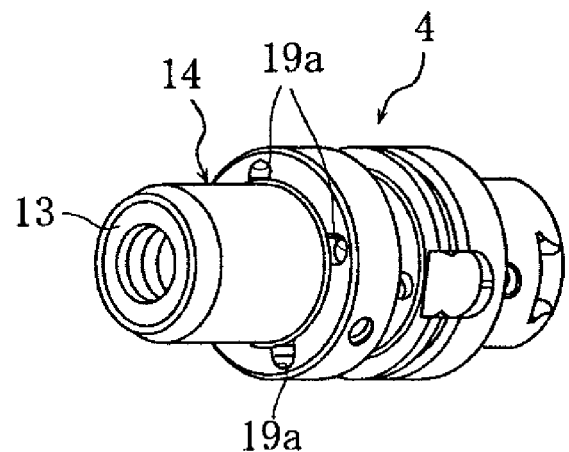
FIG. 4 is a perspective view of the holder main body.
Figure 5:
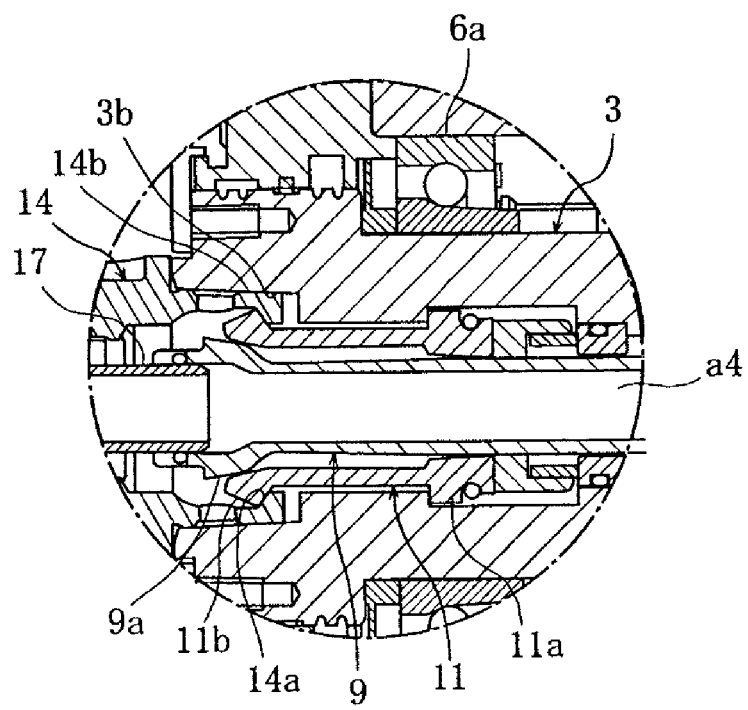
FIG. 5 is a side sectional view of a clamped portion of the holder main body of the spindle device.
Figure 6:
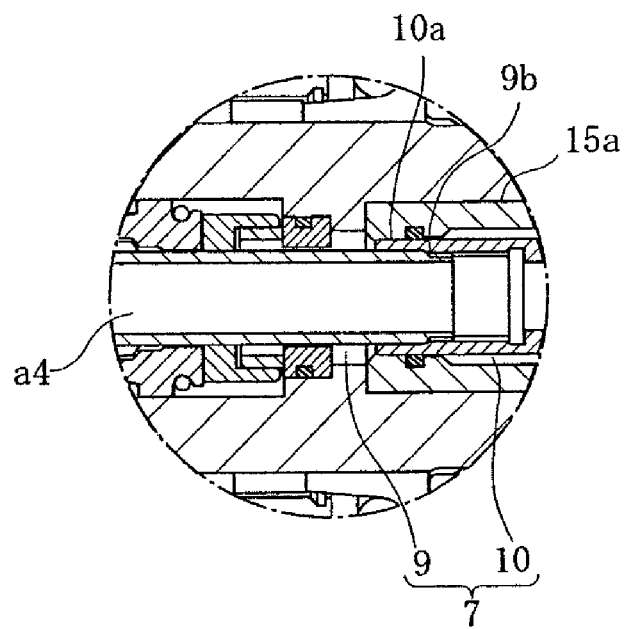
FIG. 6 is a side sectional view of a front connection portion of a draw bar of the spindle device.
Figure 7:
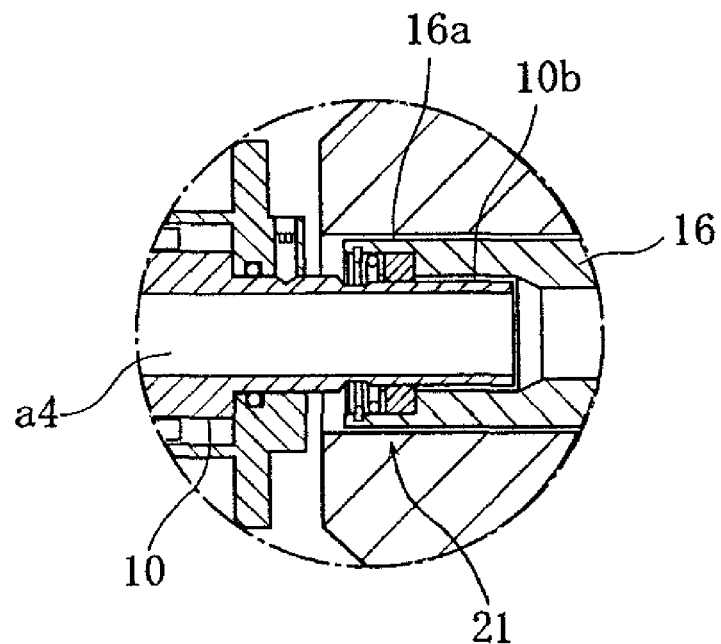
FIG. 7 is a side sectional view of a rear connection portion of the draw bar of the spindle device.
Figure 8:
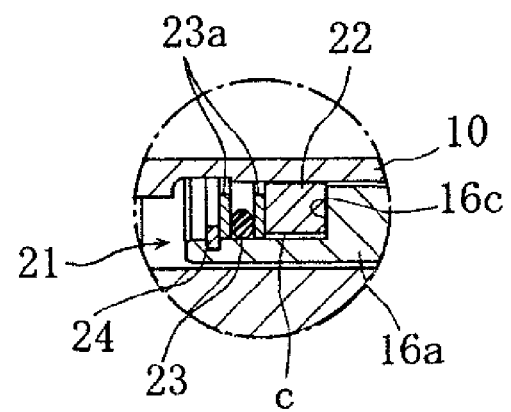
FIG. 8 is a side sectional view of a seal mechanism portion of the rear connection portion of the draw bar.

Hereinafter, embodiments of the present invention will be described based on the accompanying drawings. FIG. 1 to FIG. 8 are views to explain a holder main body according to a first embodiment of the present invention.

In the drawings, reference numeral 1 denotes a spindle device included in a machine tool such as a vertical or horizontal machining center. The spindle device 1 has: a spindle head 2 supported by a column; a spindle 3 rotatably supported by the spindle head 2; a tool holder 4 supported by a tip portion of the spindle 3; and a clamping mechanism 5 clamping/unclamping the tool holder 4 to/from the spindle 3.

The spindle 3 is a cylinder having a through hole 3a in an axial center. A front portion and a rear portion of the spindle 3 are rotatably supported by the spindle head 2 via a front bearing 6a and a rear bearing 6b respectively. Further, a tapered hole 3b is formed in a front end portion of the through hole 3a of the spindle 3, and the tool holder 4 is fixedly fitted in the tapered hole 3b. An electric motor rotary-driving the spindle 3 is disposed between the spindle 3 and the spindle head 2, though not shown.

The tool holder 4 has a cutting tool 12 and a holder main body 14 in whose mounting hole 14d the cutting tool 12 is attached via a collet 13. By using the collet 13 adapted to the diameter or the like of the cutting tool 12, it is possible to attach various kinds of cutting tools to the common holder main body.

The clamping mechanism 5 includes: a draw bar 7 inserted in the through hole 3a of the spindle 3 to clamp or unclamp the tool holder 4 to/from the tapered hole 3b; and a drive mechanism (cylinder mechanism) 8 moving the draw bar 7 in an unclamping direction.

The draw bar 7 has: a cylindrical engagement drive part 9 which brings a plurality of engaging claws 11 disposed near the tapered hole 3b into engagement with an engaging step 14a formed in a rear end portion of the holder main body 14; and a cylindrical draw bar main body 10 coupled to the engagement drive part 9.

Each of the engaging claws 11 has, at its front end, a claw part 11b which is openable in a diameter direction with respect to a base end 11a of the engaging claw 11. A cam 9a is formed in a front end of the engagement drive part 9. The cam 9a, which is slidably in contact with an inner surface of the claw parts 11b, brings the claw parts 11b into engagement with the engaging step 14a when it is at a backward position (right position in FIG. 1), and releases the engagement when it is at a forward position (left position in FIG. 1).

A large number of coned disc springs 15 are interposed between the draw bar main body 10 and the through hole 3a of the spindle 3. 15a denotes collar members restricting an axial position of the coned disc springs 15. The coned disc springs 15 bias the draw bar 7 in a clamping direction (right direction in FIG. 1). When the engagement drive part 9 is moved in the clamping direction by the biasing force, the cam 9a causes the claw parts 11b to open and as a result, the claw parts 11b engage with the engaging step 14a, so that the tapered part 14b of the holder main body 14 is firmly fitted in the tapered hole 3b.

The drive mechanism 8 is structured such that a piston 18d is inserted in a cylinder hole 18c formed by a casing 18a, which is bolt-fixed to a rear end portion of the spindle head 2, and a cover member 18b. When an oil pressure is supplied to an oil chamber b, the piston 18d moves leftward in FIG. 1 to move the draw bar 7 in the unclamping direction (left direction in FIG. 1) via a pressure plate 24 against the biasing force of the coned disc springs 15, thereby releasing the engagement of the tapered part 14b of the holder main body 14 and the tapered hole 3b.

A rear end 9b of the engagement drive part 9 forming a front portion of the draw bar 7 is inserted in a front end 10a of the draw bar main body 10 forming a rear portion of the draw bar 7 to be screwed along an inner surface of the front end 10a. Since the engagement drive part 9 is thus inserted and screwed into the draw bar main body 10, it is possible to make a diameter of a later-described fourth suction hole a4 large without increasing the maximum diameter of the draw bar 7.

Further, a coupling pipe 17 is coaxially inserted in the cam 9a of the engagement drive part 9, and the coupling pipe 17 is fixed in the holder main body 14 by a nut member 17a.

Further, a rear end 10b of the draw bar main body 10 is inserted in a front end 16a of an inner pipe 16 of the drive mechanism 8. The inner pipe 16 is inserted in the cover member 18b and also fixed to the cover member 18b.

Between the inner pipe 16 and the rear end 10b of the draw bar main body 10, a seal mechanism 21 is provided to prevent outside air from being sucked into the inner pipe 16. The seal mechanism 21 includes: a carbon seal ring 22 slidably in contact with an outer peripheral surface of the rear end 10b of the draw bar main body 10; a pressure ring 23 made of an elastic member and bringing the seal ring 22 into pressure contact with a step 16c of the inner pipe 16 via a spacer 23a; and a snap ring 4 restricting an axial position of the pressure ring 23. The seal ring 22 is in pressure contact with the step 16c owing to the elastic force of the elastic member and is also slidably in contact with the outer peripheral surface of the draw bar main body 10, thereby preventing the entrance of outside air. A clearance c is provided between the outer peripheral surface of the seal ring 22 and the inner pipe 16. This prevents the seal ring 22 from being damaged by the vibration of the draw bar main body 10 and the inner pipe 16.

In axial core portions of the coupling pipe 17, the draw bar 7, and the inner pipe 16, a fourth suction hole a4 is formed to penetrate through the axial core portions in the axial direction. As for the fourth suction hole a4, the diameters of its portion inside the coupling pipe 17, its portion in the engagement drive part 9, its portion in the draw bar main body 10, and its portion in the inner pipe 16 are set substantially equal. Further, a suction device, though not shown, is coupled to a rear end 16b of the inner pipe 16.

In an axial core of the cutting tool 12 of the tool holder 4, a first suction hole a1 is formed to penetrate through the cutting tool 12 in the axial direction. Further, in the holder main body 14, a second suction hole a2 is formed so as to be connected with the first suction hole a1 and so as to penetrate through the holder main body 14 in the axial direction. Further, a third suction hole a3 is formed in the holder main body 14 so as to be connected with the second suction hole a2. The third suction hole a3 is formed to be capable of sucking air other than suction air coming from the first suction hole a1 of the cutting tool 12, thereby increasing the velocity in the second suction hole a2. A substantial passage area of the third suction hole a3 is adjustable.

The third suction hole a3 is structured as follows. A ring member 19 in an annular shape is attached to the outer periphery of the holder main body 14 at a portion corresponding to the second suction hole a2, that is, at a portion between the cutting tool 12 and the coupling pipe 17 so as to be rotatable and so as to be fixable at a desired angle position by a setscrew 20. In an inner surface of the ring member 19, suction parts 19a in a groove shape whose axial fronts are open are formed at 90° intervals. Further, in the holder main body 14, connection parts 14c are formed via which the suction parts 19a and the second suction hole 12 can be connected with each other. The suction parts 19a and the connection parts 14c form the third suction hole a3 which functions to suck the air other than the suction air coming from the first suction hole a1 into the second suction hole a2 and thereby increases the velocity in the second suction hole a2. Further, adjusting the angle position of the ring member 19 makes it possible to adjust a connection area between the suction parts 19a and the connection parts 14c, that is, the substantial passage area of the third suction hole a3.

As described above, in the first embodiment, the first suction hole a1 is formed in the cutting tool 12, the second and third suction holes a2 and a3 are formed in the holder main body 14, and the fourth suction hole a4 is formed in the draw bar 7 and the inner pipe 16, and the suction device is coupled to the inner pipe 16. Consequently, it is possible to realize the suction of cutting chips in dust form with a simple structure.

Further, since the suction holes penetrating through the tool holder 4 and the draw bar 7 are provided, the structure is simpler than that of a conventional device in which a collection passage or the like of cutting chips is provided outside the tool holder, and moreover, tools can be automatically changed without hindrance by using a conventional automatic tool changer.

Further, the third suction hole a3 in addition to the second suction hole a2 is formed in the holder main body 14, and therefore, even when the passage area of the first suction hole a1 cannot be made large enough because the diameter of the cutting tool is small, the air other than the suction air coming from the first suction hole a1 can be sucked through the third suction hole a3. This can increase the velocity in the second suction hole a2, and as a result, it is possible to prevent cutting chips from depositing in the tool holder and the draw bar.

Further, the third suction hole a3 has the suction parts 19a of the ring member 19 rotatably attached to the holder main body 14 and the connection parts 14c via which the suction parts 19a and the second suction hole a2 can be connected with each other. Therefore, by adjusting the angle position of the ring member 19, it is possible to adjust the substantial passage area of the third suction hole a3 according to the diameter of the cutting tool and a generation amount of cutting chips. This can prevent the internal deposition of the cutting chips.

Figure 9:
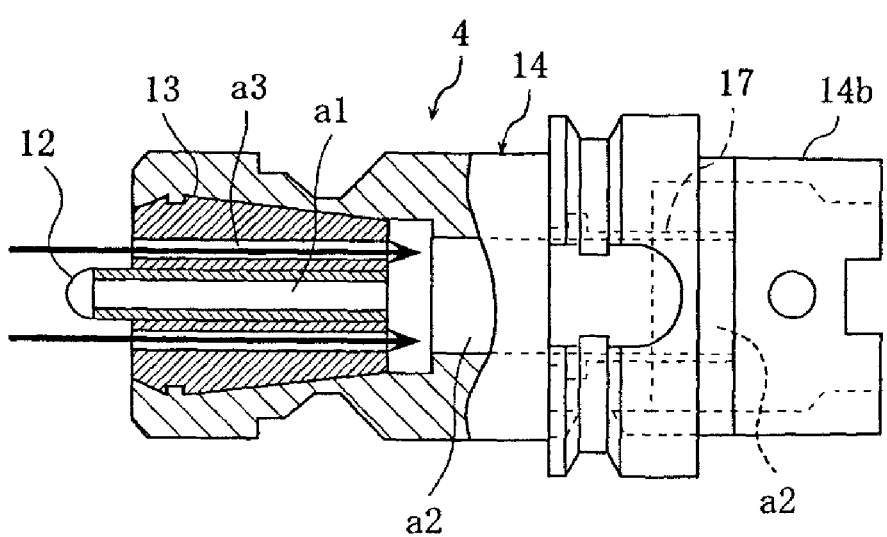
FIG. 9 is a partial side sectional view of a cutting tool and a holder main body according to a second embodiment of the present invention.

FIG. 9 is a view to explain a second embodiment of the present invention. In FIG. 9, the same reference numerals and symbols as those in FIG. 3 denote the same or corresponding parts.

In the second embodiment, third suction holes a3 are formed at 90° intervals in a collet 13 via which a cutting tool 12 is fixed to a holder main body 14. The third suction holes a3 are formed in the collet 13 so as to be positioned on a diameter-direction outer side of the aforesaid second suction hole a2 and so as to penetrate through the collet 13 in the axial direction. The third suction holes a3 function to increase the velocity in the second suction hole a2 by sucking air other than suction air coming from the first suction hole a1.

In the second embodiment, the third suction holes a3 are formed in the collet 13. Therefore, even if the passage area of the first suction hole a1 of the cutting tool 12 varies, only by selecting the optimum collet 13 in which the third suction holes a3 are formed in advance according to the diameter of the cutting tool, the passage area of the second suction hole a2, and the like, it is possible to keep the velocity of the suction air in the second suction hole a2 high enough to prevent the internal deposition.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A holder main body having a mounting hole in which a cutting tool is attachable and attached to a spindle of a machine tool, the holder main body comprising:
    a second suction hole which penetrates through the holder main body in an axial direction so as to be connected with a first suction hole penetrating in the axial direction through the cutting tool attached in the mounting hole; and
    a third suction hole connected with said second suction hole and capable of sucking air other than suction air coming from the first suction hole,
    wherein a cross sectional area through said third suction hole is adjustable, and
    wherein said third suction hole has; a suction part which is formed as an opening extending in an axial direction in a ring member rotatably attached to the holder main body; and a connection part which is formed in the holder main body and via which the suction part and a vicinity of a connection portion between said first and second suction holes are connectable, and a substantial passage area of said third suction hole is adjustable by adjustment of an angle position of the ring member.

* * * * *